C. & H. SITTNER.
MEANS FOR BENDING SPRINGS.
APPLICATION FILED JAN. 28, 1916.
1,226,918.
Patented May 22, 1917.
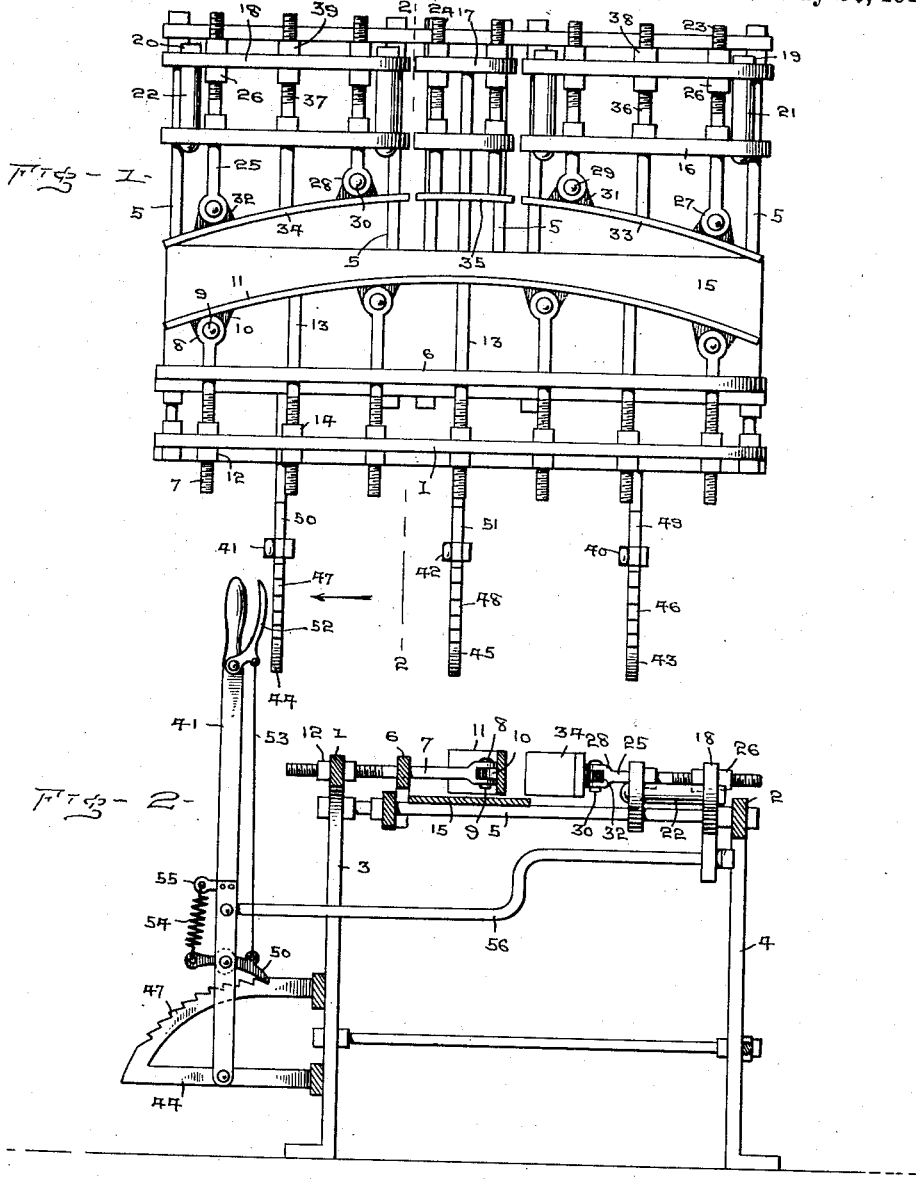

UNITED STATES PATENT OFFICE.

CONRAD SITTNER AND HENRY SITTNER, OF RITZVILLE, WASHINGTON.

MEANS FOR BENDING SPRINGS.

1,226,918. Specification of Letters Patent. Patented May 22, 1917.

Application filed January 28, 1916. Serial No. 74,813.

*To all whom it may concern:*

Be it known that we, CONRAD SITTNER and HENRY SITTNER, citizens of the United States, residing at Ritzville, in the county of Adams and State of Washington, have invented certain new and useful Improvements in Means for Bending Springs; and we do hereby declare the following to be a full, clear, and exact description of the invention, such as will enable others skilled in the art to which it appertains to make and use the same.

Our invention relates to new and useful improvements in means for bending springs and our object is to provide means for clamping a section of a spring between a stationary and movable jaws with sufficient force to cause the spring to assume the same curvature as the curvature of the jaws.

A further object is to provide means for moving the movable jaws toward or from the fixed jaw.

A further object is to provide means for adjusting the jaws to various curvatures.

And a further object is to provide means for holding the movable jaws in their inward position.

Other objects and advantages will be hereinafter set forth and more fully pointed out in the accompanying specification.

In the accompanying drawings which are made a part of this application,

Figure 1 is a top plan view of the machine, and

Fig. 2 is a sectional view thereof, as seen on line 2—2 of Fig. 1.

Referring to the drawings in which similar reference numerals designate corresponding parts throughout the several views, 1 and 2 indicate the front and rear frame bars which terminate in downwardly extending legs 3 and 4 respectively, said frame bars being connected together by means of cross rods 5. The cross rods 5 are connected together adjacent their forward ends by means of a cross bar 6, which cross bar extends in a plane with the frame bar 1, while the ends thereof are curved downwardly and engage with the cross rods.

Extending through the frame bar 1 and the cross bar 6 are bolts 7, the inner ends of which are bifurcated and the bifurcated portions formed into eyes 8 for the reception of pivot pins 9, said pins being employed for pivotally securing the bolts to ears 10, of a jaw member 11.

The outer ends of the bolts 7 are threaded to receive lock nuts 12, which nuts are placed on opposite sides of the frame member 1 and by adjusting the nuts on the threaded portion of the bolts the curvature of the jaw member 11 may be increased or decreased. In order to make the curvature of the jaw member 11 uniform throughout its length, studs 13 are extended through the frame bar 1 and cross bar 6 midway between the bolts 7, the inner ends of the studs contacting the face of the jaw member while the outer ends thereof are threaded to receive adjusting nuts 14 by means of which the studs may be adjusted inwardly or outwardly to regulate the curvature of the jaw member.

Positioned below the jaw member 11 is a platform 15, the ends of which are attached in any suitable manner to the end cross rods 5, said platform being employed for supporting a section of a spring (not shown) adjacent the jaw member 11. Slidably mounted on the cross rods 5 are a plurality of cross bars 16, 17 and 18 which are preferably arranged in pairs, the bars 16 and 18 being connected together by means of rods 19 and 20 respectively which are held in spaced relation by introducing sleeves 21 and 22 around the rods between the pairs of cross bars.

Extending through the bars 16, 17 and 18 are bolts 23, 24 and 25 respectively, the outer ends of the bolts being threaded to receive nuts 26 by means of which the bolts are adjusted longitudinally, the inner ends of the bolts 23 and 25 being bifurcated and formed into eyes 27 and 28 respectively to receive pivot pins 29 and 30 by means of which the inner ends of the bolts are pivoted to ears 31 and 32, of movable jaw members 33 and 34. The inner ends of the bolts 24 are attached to a jaw section 35 which jaw section forms a connection between the jaw sections 33 and 34 and by properly adjusting the various bolts, the curvature of the several jaw sections will be in uniformity with the curvature of the jaw member 11 so that when the jaw members 33, 34 and 35 are moved inwardly toward the jaw member 11, the section of spring positioned between the fixed jaw member 11 and the movable jaw members will be caused to assume the curvature of the jaw members.

The bolts 23 and 25 are spaced a distance apart and in order to maintain the proper curvature of the jaw sections 33 and 34 between the respective bolts, studs 36 and 37 are extended through the cross bars 16 and 18 respectively, their ends abutting against the jaw sections 33 and 34 while the opposite ends of the studs are threaded to receive adjusting nuts 38 and 39.

The movable jaw sections 33, 34 and 35 are moved forwardly or rearwardly through the medium of levers 40, 41 and 42 respectively, said levers being pivotally mounted upon brackets 43, 44 and 45, which brackets are provided with racks 46, 47 and 48, said levers having pawls 49, 50, and 51 coöperating with said racks to hold the levers in adjusted position.

The pawls 49, 50 and 51 are elevated out of engagement with their respective racks by arranging a latch 52 adjacent the upper end of each lever and connecting said latch with the engaging end of the pawl by a pull wire 53, the pawls being normally held in engagement with the racks through the medium of springs 54, one end of each spring being attached to one end of each pawl, while the opposite ends thereof are attached to eyes 55 on the respective levers. The levers are attached to the cross bars 16, 17 and 18 by means of links 56, one end of the links being pivoted to the respective levers and the opposite ends thereof to the respective cross bars. By providing this form of means for operating the movable jaw sections, the spring sections may be readily compressed into formation with the jaws and held in compressed position until cool when the spring section will remain at the same curvature, as the curvature of the respective jaws. It will also be seen that by providing the adjusting means for the jaws, the spring sections may be bent to various curvatures and it will likewise be seen that this device can be very cheaply constructed and is practically indestructible through use.

Having thus fully described our invention, what we claim as new and desire to secure by Letters Patent of the United States is:—

In a spring bending device, the combination with a support consisting of a front frame and a rear frame connected together by a plurality of upper and lower rods, said upper connecting rods also providing guide rods, a guide bar secured upon said guide rods in proximity to said front frame, a platform also upon said guide rods rearwardly of said guide bar, a stationary jaw member above said platform provided with ears upon its front side, bolts slidably mounted through said guide bar and having bifurcated ends pivotally connected to said ears and having their opposite ends threaded and projecting through the upper portion of said front frame, stud bolts slidably mounted through said guide bar and positioned between said bolts and having one of their ends contacting with the front side of said stationary jaw member and their opposite ends screw threaded and projected through the upper portion of said front frame, nuts upon the threaded ends of said bolts and said stud bolts at either side of the upper portion of said front frame, whereby to adjust the same for regulating the curvature of said stationary jaw member, a plurality of sliding frames having depending ears for slidably engaging the rearward portions of said guide rods, the outermost of said sliding frames having adjustably mounted therein screw bolts having bifurcated ends pivotally connected to ears upon the rear side of the movable jaw sections carried by said outer frames, stud bolts also adjustably mounted in the outermost of said sliding frames and having their forward ends contacting with the rear side of said sectional movable jaws between the ears thereof, screw bolts adjustably mounted in the central sliding frame and having their forward ends secured to the rear side of the intermediate movable jaw sections, whereby to regulate the curvature of said movable jaw sections, a connecting rod for each of said sliding frames, a lever connected to each of said connecting rods, whereby to move said movable jaw sections toward and from said stationary jaw member, and means for retaining said levers in their respective adjusted position.

In testimony whereof we have signed our names to this specification in the presence of two subscribing witnesses.

CONRAD SITTNER.
HENRY SITTNER.

Witnesses:
JACOB BAUER,
WILLIAM HENRY MARTIN.